March 4, 1924. 1,486,108
G. F. ALBRECHT
CHAIN DRIVE MECHANISM FOR BOBBIN SHAFTS OF ROVING FRAMES
Filed Sept. 14, 1923 3 Sheets-Sheet 1
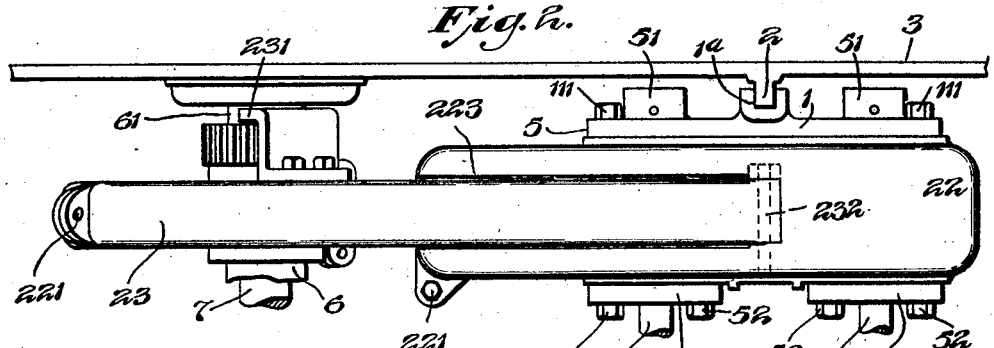
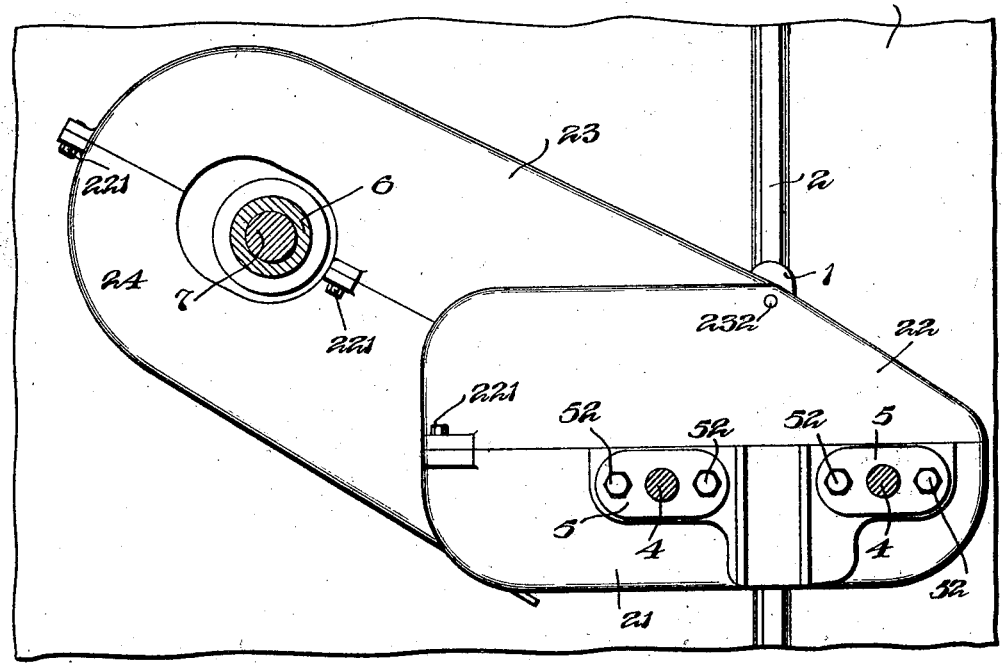
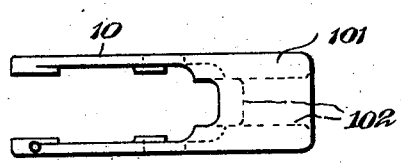
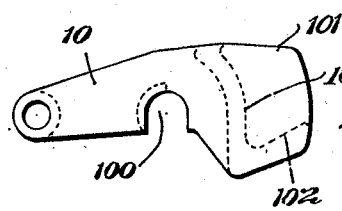
Inventor:
George F. Albrecht
by Chas. F. Randall
Attorney.

March 4, 1924. 1,486,108
G. F. ALBRECHT
CHAIN DRIVE MECHANISM FOR BOBBIN SHAFTS OF ROVING FRAMES
Filed Sept. 14, 1923    3 Sheets-Sheet 2

Inventor:
George F. Albrecht
by Chas. F. Randall
Attorney.

March 4, 1924.  
G. F. ALBRECHT  
1,486,108  
CHAIN DRIVE MECHANISM FOR BOBBIN SHAFTS OF ROVING FRAMES  
Filed Sept. 14, 1923   3 Sheets-Sheet 3

Inventor:
George F. Albrecht
by Chas. F. Randall
Attorney

Patented Mar. 4, 1924.

1,486,108

UNITED STATES PATENT OFFICE.

GEORGE F. ALBRECHT, OF WOONSOCKET, RHODE ISLAND, ASSIGNOR TO WOONSOCKET MACHINE & PRESS CO., INC., OF WOONSOCKET, RHODE ISLAND, A CORPORATION OF RHODE ISLAND.

CHAIN-DRIVE MECHANISM FOR BOBBIN SHAFTS OF ROVING FRAMES.

Application filed September 14, 1923. Serial No. 662,669.

*To all whom it may concern:*

Be it known that I, GEORGE F. ALBRECHT, a citizen of the United States, residing at Woonsocket, in the county of Providence, State of Rhode Island, have invented a certain new and useful Improvement in Chain-Drive Mechanism for Bobbin Shafts of Roving Frames, of which the following is a specification, reference being had therein to the accompanying drawings.

The invention provides simplified and improved chain-drive mechanism combined with the compound and the bobbin-shafts of a roving-frame. Also, improved covers or casings, more especially designed for employment with the said mechanism but adapted for use in other like connections.

Two types of mechanism have been employed in practice heretofore for transmitting rotary motion to the bobbin-driving shafts, usually termed bobbin-shafts, of a roving frame from the compound of the latter. The earlier type is a so-called spur-gear drive. The later type is a so-called chain-drive.

The spur-gear drive comprises a train of spur-gears, including one or more intermediates mounted upon a support which swings up and down in unison with the ascending and descending movements of the traverse-rail and bobbin-shafts, the organization being termed a horse-head.

The chain-drive as known in practice is shown and described in U. S. Letters Patent granted to Richard B. Daly, for slubber or fly frame, No. 895,541, granted August 11, 1908. It is termed the Daly drive and comprises a sprocket-wheel connected with the compound sleeve, a sprocket-chain extending from such sprocket-wheel to one on an intermediately located jackshaft, a second sprocket-chain connecting another sprocket-wheel on the jackshaft with one on one of the bobbin-shafts, and means, including a cam, for controlling the position of the jackshaft to maintain the two chains at a uniform tension during the up-and-down traverse movements of the traverse-rail and bobbin-shafts.

A spur-gear drive has drawbacks, including noisiness in operation, and also the fact that its operation is attended by alternating gain and loss in the speed of the bobbins relative to that of the spindles and fliers as the parts traverse up and down. Such gain and loss have the effect of causing variations in the stretch of the rovings as they wind upon the bobbins, causing weak places which tend to breakages. The chain-drive has advantages over the spur-gear drive in respect of being free from the noise, etc., of the latter, and also in the respect that its operation is not attended with the said alternating gain and loss. Substantially in the form, etc., shown and described in the Daly patent, it has been incorporated in a large number of roving frames in practice. In such form, it is what may be termed a two-step chain-drive, involving the use of two sprocket-chains connecting respectively the driving sprocket-wheel of the compound with the jackshaft, and the jackshaft with one of the bobbin-shafts; as well as of the compensating cam, etc., aforesaid; and is composed of a considerable number of parts.

The leading object of the invention is to produce a bobbin-shaft chain-drive mechanism having all the recognized advantages of the Daly drive, and at the same time characterized by a greatly reduced number of parts, simpler principles of construction and a simpler mode of operation, and less expensive to build, etc.

Improved chain-drive mechanism for the bobbin-shafts of roving frames, according to the first part of the invention, comprises in combination with a driving sprocket-wheel which is operatively combined with a compound and actuated thereby, and the two bobbin-shafts of a roving frame, driven sprocket-wheels which respectively are fixed to the respective bobbin-shafts, and a sprocket-chain engaging directly both of the bobbin-shaft sprocket-wheels and constituting a one-step and direct sprocket-chain connection between the said driving sprocket-wheel and each of the bobbin-shaft sprocket-wheels. In the mode of embodiment which is specifically claimed herein the sprocket-chain passes under both of the bobbin-shaft sprocket-wheels and engages with lower portions of both thereof.

The invention further includes an organized bobbin-shaft chain-drive having combined with a one-step drive-chain directly engaging with a sprocket-wheel on one or each bobbin-shaft, a movably mounted tightener-roll engaging with the slack run of such chain and actuated not only to take up any looseness developing in the slack run but, in doing so, to enwrap the chain more completely around the driven sprocket-wheel, thereby ensuring more reliable engagement between the chain and such sprocket-wheel.

The one-step direct chain-connection between the non-traversing compound and the bobbin-shafts mounted in connection with the traverse-rail and traversing vertically up and down therewith, as well as the greatly simplified general organization, distinguish in important respects a mechanism in accordance with the invention from the two-step broken or interrupted arrangement of the Daly patent. The general construction above set forth, of the simplified organization, also differentiate a bobbin-shaft chain-drive mechanism in accordance with the invention from other forms of chain-drive mechanism that have been proposed heretofore.

The simplification effected through the invention results in a large reduction in the number of parts that are required, by reason of the elimination of one of the two drive-chain connections of the Daly patent, as well as of the intermediately located jack-shaft, and its two sprocket-wheels, and of the special devices of the Daly patent whereby the jackshaft is maintained in the proper relative position with respect to the first-motion shaft of the machine and to the particular bobbin-shaft which is in chain-connection with the jackshaft, and whereby the distance of the jack-shaft from the said bobbin-shaft is kept uniform by automatic compensation during the up-and-down traverse, to keep the tension of the second chain uniform.

Improved covers in accordance with the second part of the invention comprise cover-sections, one thereof swinging around the main shaft and the other fixedly mounted in connection with the traverse-rail, the said sections jointed together so as to allow for the up-and-down movements of the traverse-rail, while keeping the bobbin-shaft drive mechanism covered and shielded in all positions of the traverse-rail up and down. The said cover-sections, in addition, are so constructed and fitted together that nothing accidentally can enter or be entered into places where injury or the like might occur. They are designed to prevent waste or a cleaning cloth, a tool, bobbin, or one's finger or hand from finding access to the drive-chain and sprocket-wheels, or between overlapping parts of the cover-sections.

Illustrative embodiments of the features of the invention are shown in the drawings, in which latter,—

Fig. 1 is a view of that portion of a roving frame containing one of the said embodiments, in section in a vertical plane extending from front to rear.

Fig. 2 is a plan view of the parts which are shown in Fig. 1.

Fig. 5 is a side elevation of the swinging carrier-frame of the tension roll.

Fig. 6 is a plan view of the said carrier-frame.

Figure 4:
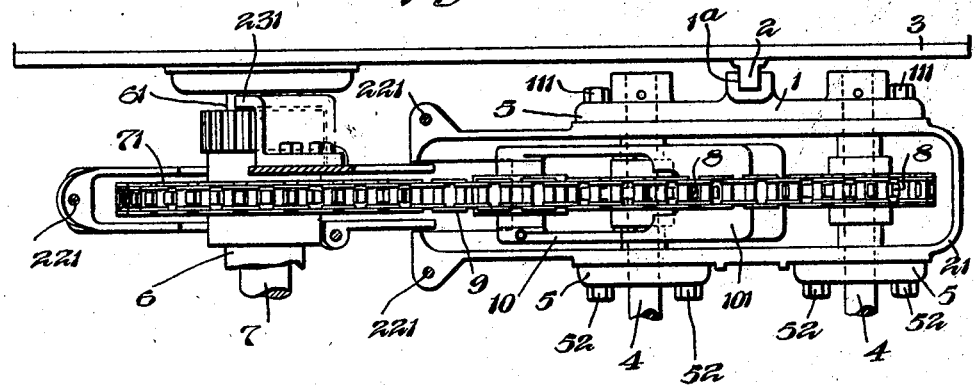
Fig. 4 is a plan view with the cover-section tops removed.
Figure 3:
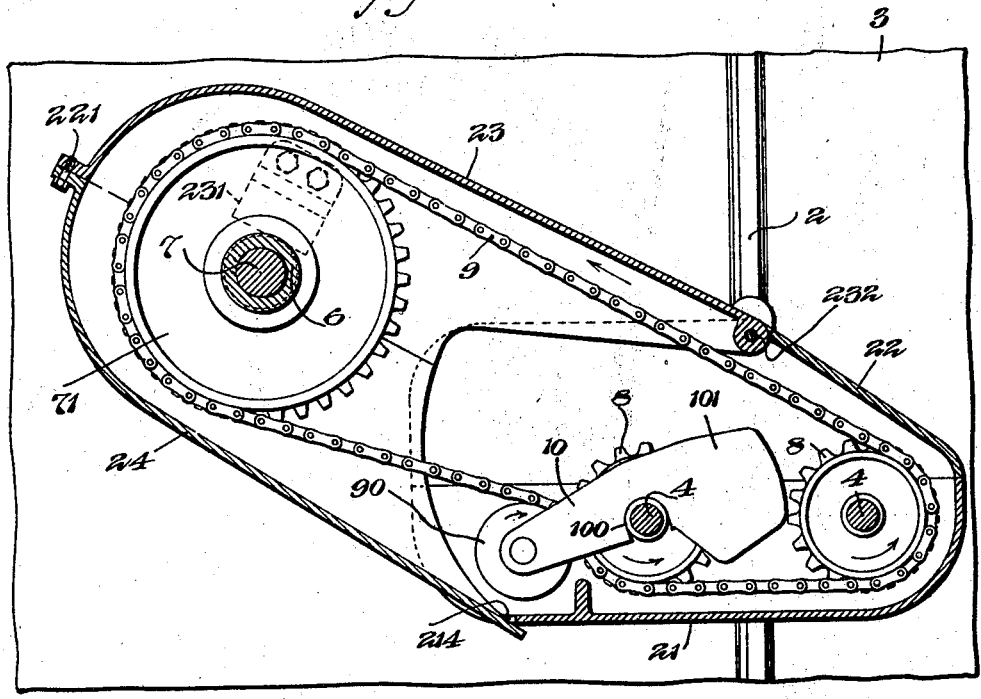
Fig. 3 is a side view with the covers of the bobbin-shaft drive in section in a vertical plane parallel with the plane of section of Fig. 1.
Figure 7:
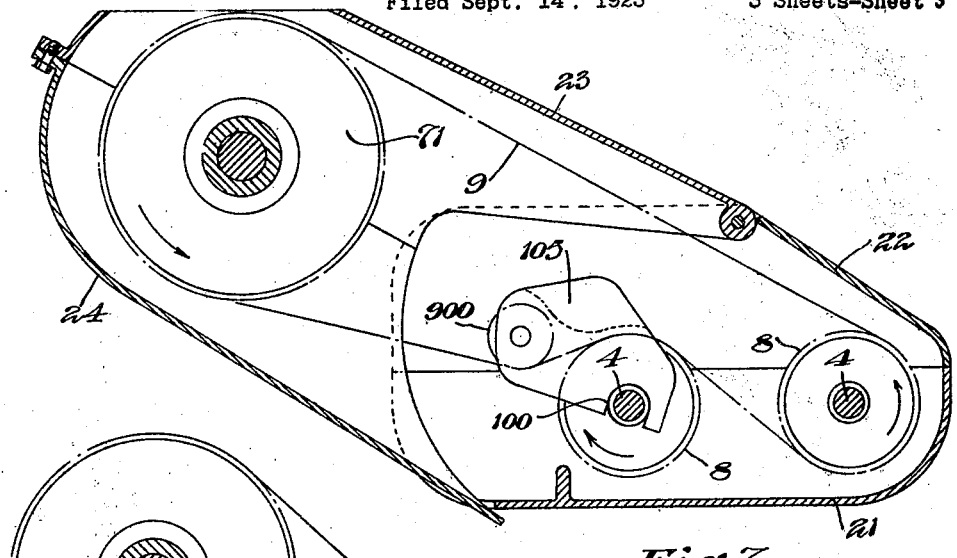
Figure 8:
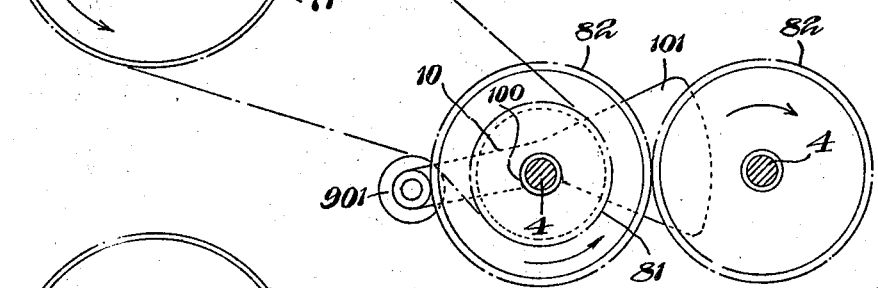
Figure 9:
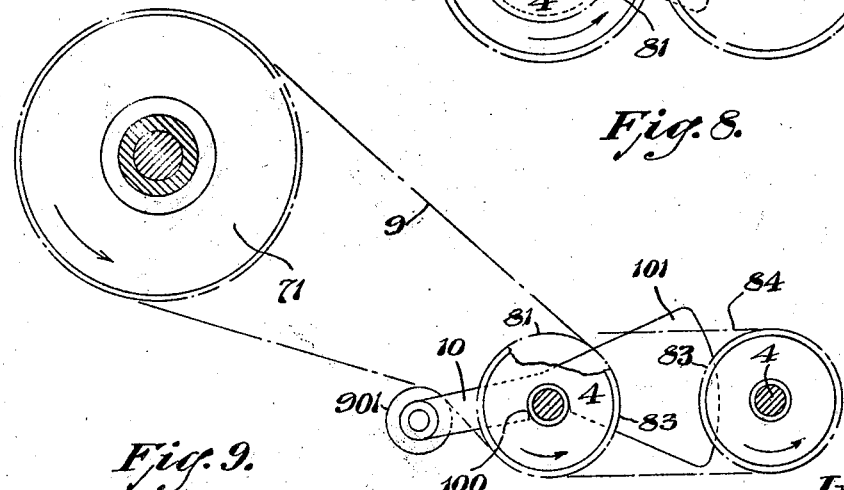

Figs. 7, 8, and 9 show diagrammatically modified combinations of drive-chain, sprocket-wheels, tighteners, etc., the covers being omitted in the case of Figs. 8 and 9.

The drawings do not show the usual traverse-rail, but they do show a slide 1 such as that which in practice is connected with the head end of the traverse-rail, its outer side having a groove 1$^a$ receiving a vertically-extending guide-rib 2 upon the head 3 of the machine-frame, on which guide-rib the slide moves up and down in the vertical traversing movement of the traverse-rail. The covers 21, 22, hereinafter described, they constituting the bobbin-shaft gear-box, are attached to the said slide by means of suitable bolts 111, 111. The drawings show the end-portions of bobbin-shafts 4, 4, as mounted in bearings 5, 5, and 51, 51, in connection with the bottom cover-section of the said gear-box, and with the said slide, respectively. In usual practice there are two bobbin-shafts, as required for the driving of the two longitudinal lines of bobbins surrounding the two longitudinal lines of flier-spindles employed in a roving frame, the said bobbin-shafts being driven through connections with the sleeve 6 surrounding the main shaft 7, the said sleeve being an element of the compound and being driven in well-known manner at progressively varying speed in the operation of the machine.

Referring now to the chain-drive mechanism constituting the first part of the invention, and first to the embodiment shown in Figs. 1 to 6: A driving sprocket-wheel 71 is fixedly connected with the compound sleeve 6, and each bobbin-shaft 4 has fixed thereon a sprocket-wheel 8. A sprocket-chain 9 extends partway around the driving sprocket-wheel 71, in engagement with the latter, and as one characteristic specific feature of the invention one run of the chain extends across both of the sprocket-wheels 8, 8, and in direct engagement with both thereof, in this instance passing across below the two, although the arrangement may be modified, the chain then extending partway around the wheel 8 of the forward bobbin-shaft, and its upper run extending rearward to the driving sprocket-wheel 71 of the compound sleeve 6. The total length of the chain is sufficient to permit the required extent of up-and-down traverse of the traverse rail to occur. For the purpose of taking up such slack as may form in the chain at different points of the traverse, and holding the chain at all times in proper engagement with the sprocket-wheel 8 of the rear bobbin-shaft, I employ a tension-roll 90, which in this instance is journaled in the arms of a forked carrier 10 having an open-bottomed bearing 100 by means of which it is hung upon the rear bobbin-shaft 4. In this instance, also, the overbalancing weight of the portion 101 of the said carrier at the front of the said rear bobbin-shaft bears the roll upward, causing it to press the lower run of the chain yieldingly upward just at the rear of the sprocket-wheel 8 of the rear bobbin-shaft, the location of the roll close to the periphery of the said sprocket-wheel, and its movement in an arc concentric with the said periphery, causing the chain to wrap around such periphery as the roll is swung by the action of the said overbalancing weight, whereby the slack of the chain is taken up quickly with a comparatively slight upward movement of the roll. The weighted extremity of the carrier 10 is in this instance recessed underneath, as indicated in dotted lines at 102, 102, Figs. 5 and 6, to afford clearance for the lower run of the chain, so that such run will not interfere with free movement of the said extremity downward, as far as permitted by the slack of the chain.

The chain and sprocket-wheel organization shown by Figs. 1 to 6 constitutes a simple and direct drive from the compound sleeve to the respective bobbin-shafts by means of a single chain engaging directly with the compound sleeve gear and with the bobbin-shaft gears, and the movably mounted tension-roll compensates for slackening and tightening of the said chain due to ascent and descent of the traverse-rail.

The illustrative embodiment of the drive-chain principles that is shown diagrammatically in Fig. 7 corresponds with that shown in Figs. 1 to 6 in the respect that therein one and the said sprocket-chain engages directly with the gear on the compound sleeve and with sprocket-wheels on both of the bobbin-shafts, but differs therefrom in the respect that the lower run of the drive-chain passes over the sprocket-wheel 8 of the rear bobbin-shaft, and in engagement with the top portion thereof, before passing under and partly around the sprocket-wheel 8 of the front bobbin-shaft; and further in the location of the tension-roll 900 in a position above the said lower run where it bears downward upon said run at a point closely behind the said sprocket-wheel of the rear bobbin-shaft. The tension-roll 900 is represented as actuated yieldingly by its weight and that of the overweighted rear portion of a roll-carrier 105. It has the same effect as the roll 90 of Figs. 1 to 6 in causing the chain to wrap further around the rear sprocket-wheel 8 in taking up looseness of the chain.

As will be perceived, the features of invention which have been described enable me to dispense with special cam-arrangements, and with other special organizations, such as heretofore have been employed in practice, or have been proposed to be employed, in connection with bobbin-shaft drive mechanism to compensate for, the traversing movements of the traverse-rail and the bobbin-shafts up and down relative to the first-motion or main shaft 7 and the compound thereon.

Fig. 8 shows an application of a tension-roll 901 in connection with a drive-chain 91 extending from the sprocket-wheel 71 of the compound to and partly around a sprocket-wheel 81 fixed on the rear bobbin-shaft. In this view, only one of the bobbin-shafts has a sprocket-wheel, 81, the two bobbin-shafts being geared together by means of spur-gears 82, 82, so that the front bobbin-shaft is driven from the rear bobbin-shaft. The tension-roll 901 is mounted in a swinging carrier 10 hung upon the rear bobbin-shaft 4, these parts being arranged and operating the same as in the case of the tension-roll and carrier of Figs. 1 to 6 in causing the chain 91 to wrap further around the sprocket-wheel 81 in taking up looseness of the chain.

The construction, etc., shown in Fig. 9 are closely similar to those of Fig. 8, with the difference that the two bobbin-shafts are geared together by means of sprocket-wheels 83, 83, fixed upon the said shafts, and a sprocket-chain 84 passing around the said sprocket-wheels 83, 83, and in engagement therewith.

Referring to the improved covers or casings, as illustrated in the drawings, and having reference first to Figs. 1 to 4,—

The two cover-sections comprise, respectively, a front section 21, 22, and a rear section 23, 24. The front section I term a bobbin-shaft-gear box. It encloses the bobbin-shaft gears 8, 8, the tension-roll 90 and roll-carrier, and upper and lower portions of the drive-chain adjacent said parts. The rear section encloses the chain-driving sprocket-wheel 71 connected with the compound, and upper and lower portions of the drive-chain extending rearward of the bobbin-shaft-gear box to the sprocket-wheel 71. Each of the said sections is of split construction; namely, composed of upper and lower halves meeting at their proximate edges and held together edge to edge by fastenings which in this instance are constituted by bolts 221, 221, engaged with lugs projecting outward from the said halves. The two halves of the bobbin-shaft-gear box are fastened to the slide 1 by bolts 111, 111, and thereby supported in fixed relations with respect to the traverse-rail and bobbin-shafts, as previously mentioned. The rear cover-section 23, 24, is supported in proper relations with the driving sprocket-wheel 71 by means of a lug 231 projecting laterally and downward from the top 23 thereof and resting upon a hub or sleeve 61 concentric with shaft 7. A forwardly projecting extension of the said top 23 of the rear cover-section encloses the greater portion of the length of the top run of the drive-chain, from driving sprocket-wheel 71 nearly to sprocket-wheel 8 of the front bobbin-shaft. To cause the rear cover-section to swing in unison with the rise and fall of the traverse-rail and bobbin-shafts, this extension is jointed at 232 to the top half 22 of the front cover-section. As the rear cover-section swings, the supporting lug 231 rocks upon the exterior of the sleeve 61. The said extension occupies and substantially fits a slot 223, Fig. 2, in the top 22 extending frontward and rearward. Widthwise, it substantially fills the said slot, at the front end of which the point of pivotal connection 232 is located. Nothing can enter into the slot vertically from above. The downturned side-portions or flanges of the extension are of sufficient width vertically to remain within the slot at all elevations of the traverse-rail, so that nothing can enter laterally beneath the extension at any elevation. The rear portions of the top and bottom halves 22, 21, of the front cover-section are slotted vertically at 224, 214, and the front ends of the bottom half 24 of the rear cover-section, and of the top half 23, project into the slots, which they fit closely widthwise. The lower portion of the front end of bottom half 24 also projects forward close to the lower end of slot 214 in the bottom half 21 of the front cover-section. This construction provides for sheathing the front portions of the rear cover-section within the front cover-section in such manner that nothing can accidentally enter or be entered into places where injury might occur. Hence the construction prevents waste or a cleaning cloth, a tool, bobbin, or one's finger or hand from finding access to the drive-chain and sprocket-wheels or between overlapping parts of the two cover-sections. It safeguards operatives from injury, not only by preventing their hands or fingers from being caught and crushed by the chain and sprocket-wheels of the chain-drive mechanism, but by reason of the relatively movable cover-sections being fitted and arranged to work together so as to avoid the opening of a gap between them into which a hand or finger might be inserted inadvertently and wherein it might be crushed or amputated in the closing of the gap.

In Fig. 7 the cover-arrangement which has just been described is shown applied in connection with the modified chain-arrangement in which the drive-chain passes over the rear sprocket-wheel 8 and under and partly around the front sprocket-wheel 8. Similar cover-arrangements may be employed in connection with the modified drive-chain mechanisms of Figs. 8 and 9.

A cover-arrangement substantially such as described is not limited to use with the particular forms of mechanism herein shown for actuating the bobbin-shafts from the compound.

The illustrative embodiment of the first portion of the invention which is shown in Fig. 7 is separately presented and specifically claimed in my application for U. S. Letters Patent filed Sept. 24, 1923, Serial No. 664,510, and those which are shown in Figs. 8 and 9 are separately presented and specifically claimed in my application filed Sept. 24, 1923, Serial No. 664,511.

Whenever it is desired to inspect the sprocket gearing, cover-tops 22, 23, are unfastened and removed, the removal of fastening bolts 221, 221, freeing bottom cover 24. Should it be desired to remove shafts 4, 4, the pintle holding the tightener-roll 90 in carrier-frame 10 is removed so as to permit said roll to be separated from the carrier, and then the carrier is lifted up from the rear bobbin-shaft 4. Then the chain 9 may be dropped off sprocket-wheel 71 and after the butt-end sections of the shafts 4, 4, have been uncoupled from the next succeeding sections, and the inner bearings 5, 5, have been released by removal of the securing screws 52, 52, the said butt-end sections may be lifted up and withdrawn.

What is claimed as the invention is:—

1. Chain-drive mechanism for the bobbin-shafts of roving frames comprising, in combination with a driving sprocket-wheel operatively combined with a compound and actuated thereby, and two bobbin-shafts each provided with a driven sprocket-wheel fixed thereto, a sprocket-chain engaging directly both of the bobbin-shaft sprocket-wheels and constituting a one-step sprocket-chain connection between the driving sprocket-wheel directly with each of the bobbin-shaft sprocket-wheels.

2. Chain-drive mechanism for the bobbin-shafts of roving frames comprising, in combination with a driving sprocket-wheel operatively combined with a compound and actuated thereby, and two bobbin-shafts each provided with a driven sprocket-wheel fixed thereto, a sprocket-chain passing under both of the bobbin-shaft sprocket-wheels and engaging with the lower portions of both thereof, constituting a direct one-step sprocket-chain connection between the driving sprocket-wheel directly with each of the bobbin-shaft sprocket-wheels.

3. Chain-drive mechanism for bobbin-shafts of roving frames comprising, in combination with a bobbin-shaft, a driven sprocket-wheel in fixed connection with such shaft, and a driving sprocket-wheel operatively combined with the compound and actuated thereby, a sprocket-chain constituting a direct or one-step sprocket-chain connection between the driving and driven sprocket-wheels, and a yieldingly-actuated tightener-roll engaging with the slack run of the chain close to the driven sprocket-wheel and acting with a tendency to wrap it more completely around such sprocket-wheel.

4. Chain-drive mechanism for bobbin-shafts of roving frames, comprising, in combination with two bobbin-shafts, each provided with a driven sprocket-wheel fixed thereto, and a driving sprocket-wheel operatively combined with the compound and actuated thereby, a sprocket-chain constituting a direct or one-step sprocket-chain connection between the driving sprocket-wheel and each of the driven bobbin-shaft sprocket-wheels, and a yieldingly-actuated tightener-roll engaging with the slack run of the chain close to one of the driven sprocket-wheels and acting with a tendency to wrap the chain more completely around such sprocket-wheel.

5. Chain-drive mechanism for bobbin-shafts of roving frames comprising, in combination with two bobbin-shafts, each provided with a driven sprocket-wheel fixed thereto, and a driving sprocket-wheel operatively combined with the compound and actuated thereby, a sprocket-chain constituting a direct or one-step sprocket-chain connection between the driving sprocket-wheel and each of the driven bobbin-shaft sprocket-wheels, the said chain passing under both of the said driven sprocket-wheels and engaging with the lower portions of both thereof, and a yieldingly-actuated tightener-roll engaging with the slack run of the chain close to one of the driven sprocket-wheels and acting with a tendency to wrap the chain more completely around such sprocket-wheel.

6. In a roving frame, or the like, the combination with a driving-wheel connected with the compound of said frame, bobbin-shafts which are traversed vertically, and driving connections intermediate the said wheel and the said shafts, of front and rear cover-sections respectively enclosing the bobbin-shaft gears and the driving-wheel, with said cover-sections in hinge-connection with each other causing the rear section to rock in unison with the rise and fall of the traverse, and also with one section sheathed within the other at all elevations of the traverse to prevent insertion of waste, tools, one's fingers or the like between portions of the two sections.

7. In a roving frame, or the like, the combination with a driving-wheel connected with the compound of said frame, bobbin-shafts which are traversed vertically, and driving connections intermediate the said wheel and the said shafts, of a bobbin-shaft-gear box slotted vertically at top and rear, and a rear cover-section enclosing said driving-wheel adapted to swing vertically having a front extension fitting the slot in the top of the said box and in hinge-connection with said box, and with said extension and the lower front portion of the rear cover-section sheathing within the slotted portions of the gear-box.

8. In a roving frame, or the like, the combination with a driving sprocket-wheel connected with the compound of said frame, bobbin-shafts which are traversed vertically, driven sprocket-wheels combined with said shafts, and a sprocket-chain passing around the driving sprocket-wheel, and also engaging the driven sprocket-wheels, of a gear-box enclosing said driven sprocket-wheels and the adjacent portions of the chain, slotted at top and rear, and a rear cover-section adapted to swing relatively to the driving sprocket-wheel, having a forward extension protecting the upper run of the chain and in pivotal connection with said gear-box, and with said forward extension and lower front portions of the rear cover-section sheathed within the slots of the gear-box and closing the said slots at all heights of the bobbin-shafts in their traverse.

9. Chain-drive mechanism for bobbin-shafts of roving frames comprising, in combination with a bobbin-shaft, a driven sprocket-wheel in fixed connection with such shaft, and a driving sprocket-wheel operatively combined with the compound and actuated thereby, a sprocket-chain constituting a direct or one-step sprocket-chain connection between the driving and driven sprocket-wheels, and a tightener-roll engaging with the slack run of the chain close to the driven sprocket-wheel and actuated to wrap the chain more completely around such sprocket-wheel in taking up slack.

10. Chain-drive mechanism for bobbin-shafts of roving frames, comprising, in combination with two bobbin-shafts, each provided with a driven sprocket-wheel fixed thereto, and a driving sprocket-wheel operatively combined with the compound and actuated thereby, a sprocket-chain constituting a direct or one-step sprocket-chain connection between the driving sprocket-wheel and each of the driven bobbin-shaft sprocket-wheels, and a tightener-roll engaging with the slack run of the chain close to one of the driven sprocket-wheels and actuated to wrap the chain more completely around such sprocket-wheel in taking up slack.

GEORGE F. ALBRECHT.